United States Patent [19]

Hunter et al.

[11] 4,325,794

[45] Apr. 20, 1982

[54] COMBINED VISIBLE LIGHT AND THERMALLY ACTIVATED CONTINUOUS POLYMERIZATION PROCESS

[75] Inventors: Wood E. Hunter; Kenneth A. Kun; Wallace B. Ramsey, all of Pittsburgh, Pa.

[73] Assignee: Calgon Corporation, Pittsburgh, Pa.

[21] Appl. No.: 155,268

[22] Filed: Jun. 2, 1980

[51] Int. Cl.$^3$ .............................................. C08F 2/48
[52] U.S. Cl. ........................... 204/159.23; 204/159.22; 204/159.24; 526/205; 526/217; 526/219; 526/229; 526/287; 526/291; 526/292.2; 526/292.95; 526/303.1; 526/317
[58] Field of Search ............... 204/159.22, 159.23, 204/159.24; 526/205, 217, 219, 229, 287, 292, 303, 317, 291, 292.2, 292.95, 303.1

[56] References Cited

U.S. PATENT DOCUMENTS

| | | | |
|---|---|---|---|
| 2,850,445 | 9/1958 | Oster | 204/159.24 |
| 2,875,047 | 2/1959 | Oster | 96/35 |
| 2,880,152 | 3/1959 | Hiltz et al. | 204/158 |
| 2,880,153 | 3/1959 | Hiltz et al. | 204/158 |
| 3,726,688 | 4/1973 | Rust | 204/159.23 |
| 3,795,520 | 3/1974 | Nebe | 204/159.23 |
| 3,926,756 | 12/1975 | Restaino | 204/159.22 |
| 4,016,334 | 4/1977 | Collins et al. | 204/159.23 |
| 4,140,605 | 2/1979 | Sano et al. | 204/159.23 |
| 4,222,835 | 9/1980 | Dixon | 204/159.23 |
| 4,230,766 | 10/1980 | Gaussens et al. | 204/159.23 |

*Primary Examiner*—Harry Wong, Jr.
*Attorney, Agent, or Firm*—Rudolph J. Anderson; Martin L. Katz; R. Brent Olson

[57] ABSTRACT

Continuous process for the preparation of water-soluble polymers in which highly concentrated monomer solutions may be polymerized by a combination of a visible light and a thermally initiated process.

9 Claims, No Drawings

COMBINED VISIBLE LIGHT AND THERMALLY ACTIVATED CONTINUOUS POLYMERIZATION PROCESS

This invention relates to a process for the preparation of water-soluble polymers.

More particularly, this invention relates to a continuous polymerization process for the preparation of water-soluble polymers which utilizes a combined visible light and thermal initiation system.

Many processes are known in the prior art for the preparation of water-soluble polymers. For example, water-soluble polymers have been prepared in solution, in suspension and in emulsion using chemical initiators. These processes, however, generally result in low conversion, low concentration of product and a lack of uniformity of product quality. In addition, various other polymerization processes have been proposed, as for example, photopolymerization processes such as those disclosed in U.S. Pat. Nos. 2,850,445; 2,880,152 and 2,880,153, and high energy irradition processes such as is disclosed in U.S. Pat. No. 3,926,756. The above-referenced processes, however, suffer from a variety of disadvantages, such as high capital cost, low conversion, high energy requirements, low initial monomer concentration and numerous other problems. Copending application U.S. Ser. No. 132,726, filed Mar. 24, 1980, is directed to a visible light activated polymerization process and overcomes many of the above-mentioned disadvantages of the prior art. However, as the cost of energy continues to increase dramatically, it is desirable to further reduce energy requirements and increase conversion.

Accordingly, it is an object of this invention to provide a process for the preparation of water-soluble polymers that permits use of high monomer concentrations.

It is a further object of this invention to provide a process for the preparation of water-soluble polymers that eliminates the need of nitrogen purging to remove oxygen from the system.

It is an additional object of this invention to provide a process for the preparation of water-soluble polymers which permits good control over the reaction exotherm.

It is a still further object of this invention to provide a process for the preparation of water-soluble polymers that reduces capital requirements and operating costs.

It is another object of this invention to provide a process for the preparation of water-soluble polymers that reduces energy requirements and increases the conversion of monomer to polymer.

These and other objects of this invention are accomplished by a process in which a visible light activated continuous polymerization system is used. The process of the present invention may be used to polymerize one or more ethylenically unsaturated monomers such as acrylamide, acrylic acid, quaternary ammonium compounds or the corresponding free amine, such as methacryloyloxyethyl trimethyl ammonium chloride, methacryloyloxyethyl trimethyl ammonium methylsulfate, methacrylamido-3-propyl trimethyl ammonium chloride, 3-acrylamido-3-methyl butyl trimethyl ammonium chloride or 2-acrylamido-2-methyl propane sulfonic acid. The process may be used to prepare the free acid or the water-soluble salts of any of the aforementioned monomers. Aqueous monomer solutions are prepared and the monomer solution fed to the polymerization apparatus at a concentration in the range of from 25 to 75 percent, preferably 40 to 60 percent by weight. Polymers having molecular weights of at least 50,000, and preferably at least 1,000,000, as measured by viscometry, may be prepared by the process of this invention. These polymers may be dried and dissolved in water for use by a variety of conventional techniques.

As previously mentioned, the polymerization process of this invention is initiated by a combination of visible light and one or more thermal initiators. Visible light may be defined as light having a wavelength in the range of approximately 4000 to 7000 Angstroms. Accordingly, any photoreducible dye and weak reducing agent may be used. Suitable photoreducible dyes include thiazines such as methylene blue, thionene and methylene green, isoalloxazines and riboflavin or phthaleins such as eosin and rhodamine B.

Suitable reducing agents include amines such as triethanolamine and ethylenediaminetetraacetic acid, alcohols such as n-butanol, propylene glycol and glycerine, and sulfur compounds such as sodium metabisulfite. The preferred system is a mixture of methylene blue and triethanolamine in a molar ratio of 0.0000025 to 1, preferably 0.0005 to 0.002.

The use of a thermal initiator in conjunction with the visible light initiator enables the lights to be shut off after polymerization has been initiated and the exotherm has raised the temperature of the partially polymerized reaction media to a level sufficient to activate the thermal initiator. This reduces the energy requirements and permits higher conversion of monomer to polymer. When the process of this invention is carried out continuously, this permits the use of a smaller bank of lights. Suitable thermal initiators include free radical initiators such as ammonium persulfate, organic peroxides and azo compounds as, for example, azobisisobutyronitrile or 4-azobiscyanovaleric acid. The thermal initiator should be present in a concentration of from $1 \times 10^{-5}$ moles per liter to $1 \times 10^{-2}$ moles per liter, more preferably from $1.0 \times 10^{-4}$ moles per liter to $1 \times 10^{-3}$ moles per liter.

The polymerization process of the present invention is continuous and is preferably carried out on a continuous belt which is driven by two spaced apart rotating drums. The belt may be stainless steel or plastic and is preferably release coated with a suitable agent. Lights are positioned over the belt in such a manner as to provide the desired light intensity to the monomer/initiator mixture which is fed, at the desired thickness, onto the surface of the belt. Cooling or heating water may be sprayed against the underside of the belt to control the reaction temperature and the belt speed may be varied to control the reaction time.

The polymerization process of the present invention does not require a nitrogen purge. It may be carried out in an oxygen-containing environment such as air or in an inert gas such as nitrogen or argon, if desired.

Suitable light intensities include those in the range of 1000- to 10,000-foot candles, preferably 4000- to 10,000-foot candles, and may be supplied by any suitable source, as for example, incandescent floodlights. Initiation temperatures should be in the range of 5° C. to 45° C., preferably 10° C. to 25° C., and film thickness should be in the range of $\frac{1}{8}$ inch to 1 inch, preferably $\frac{1}{4}$ inch to $\frac{1}{2}$ inch, while reaction time should be in the range of 5 minutes to 120 minutes, preferably 40 minutes to 70 minutes, and pH should generally be in the range of 3.0 to 10.0, preferably 6.0 to 9.0.

The polymers produced in accordance with the process of the present invention may be recovered by conventional means. They may be dried, partially or completely, by known techniques to produce a gel or particulate product.

It should be understood by those skilled in the art that these parameters will vary somewhat depending on the particular polymers being produced in accordance with the teachings of the present invention.

The process of the present invention may be illustrated by the following representative examples.

EXAMPLE I

A polymerization apparatus which comprises a continuous belt was adapted for photopolymerization by encasing the belt in a plywood box (12 feet long). Three rows of lights were installed in the box on 5¼-inch centers at a distance from the belt which results in a light intensity of 3000- to 4000-foot candles. The apparatus was equipped with cooling facilities on the underside of the belt.

Acrylamide (73.63 pounds) and deionized water were charged to a 50-gallon mix tank. With agitation, methylene blue (0.10 g) and triethanolamine (40.86 g) were added and mixed until dissolved. This solution was kept in the dark and purged with air to prevent polymerization.

The monomer mix was fed to the moving belt in a fashion to give a film thickness of ⅜ inch. As the monomer solution entered the belt, a solution of 4,4'-azobis-4-cyanovaleric acid (14.0 g) in deionized water (100 g) at pH 6.5 was added to it. The ratio of initiator solution to monomer solution was 0.008 g/g. As the monomer solution entered the belt, the lights were turned on and cooling applied. Initiation of polymerization was evidenced by a temperature rise and color disappearance. When the temperature reached 50° C., the lights were turned off. Polymerization continued to occur as evidenced by a continued temperature rise to 95° C. Conversion was 95.1 percent and the polymer had a reduced viscosity at 0.05 g/100 ml 1 M NaCl of 11.2 dl/g.

EXAMPLE II

Effect of Thermal Initiator on Residual Monomer

Using the apparatus of Example I, deionized water (15.9 pounds) and glacial acrylic acid (5.15 pounds) were charged to a 50-gallon mix tank. With agitation and cooling, the monomer solution was treated with 50 percent sodium hydroxide (5.7 pounds) to a final pH of 8.0. The temperature was kept below 40° C. for this neutralization. Methylene blue (0.041 g) and triethanolamine (32.85 g) were added and mixed until uniform.

The monomer solution was pumped onto the moving belt at a thickness of ⅜ inch, and the lights turned on. Initiation was indicated by a temperature rise, solution decoloration, and formation of a thick gel sheet.

For evaluation of the effect of thermal initiator on conversion, a solution of 4,4'-azobis-4-cyanovaleric acid (14.0 g) in deionized water (100 g) at a pH of 6.5 was fed into the monomer solution at a rate sufficient to give the desired solution concentration. Results are shown in Table 1.

TABLE 1

| Dye/TEA (M/M) | Concentration ACVA (Moles/Liter) | Conversion (Percent) | Polymer Reduced Viscosity (dl/g) |
|---|---|---|---|
| $6 \times 10^{-6}/6 \times 10^{-3}$ | None | 89.8 | 21.2 |
|  | $1.2 \times 10^{-3}$ | 96.8 | 25.1 |
| $12 \times 10^{-6}/12/10^{-3}$ | None | 95.9 | 14.4 |
|  | $2.0 \times 10^{-3}$ | 97.0 | 15.5 |

We claim:

1. A continuous polymerization process for preparing water-soluble polymers of ethylenically unsaturated water-soluble monomers which comprises:
   (a) casting upon a continuous belt apparatus to form a film having a thickness of ⅛ inch to 1 inch an aqueous monomer solution having a monomer concentration of 25 percent to 75 percent by weight, said monomer solution also containing a photoreducible dye in a concentration of $1 \times 10^{-7}$ to $1 \times 10^{-4}$ moles/liter, a mild reducing agent in a concentration of $1 \times 10^{-5}$ to $1 \times 10^{-2}$ moles/liter and a thermal initiator in a concentration of $1 \times 10^{-5}$ to $1 \times 10^{-2}$ moles/liter;
   (b) passing the solution under a series of lights which emit visible light at an intensity of 1000- to 10,000-foot candles and controlling the temperature of the monomer solution in the range of 5° C. to 45° C.;
   (c) allowing polymerization to initiate in an atmosphere of air or an inert gaseous substance;
   (d) shutting off the lights when the exotherm has increased the temperatures of the partially converted monomer solution to a level sufficient to activate the thermal initiator; and
   (e) allowing the polymerization to be completed to a high degree of conversion.

2. A process as in claim 1 which comprises the additional step of recovering the polymeric product as a polymer gel or a dry product by heating at 50° C. to 150° C. for a time period to remove water.

3. A process as in claim 1 wherein the dye is methylene blue.

4. A process as in claim 1 wherein the reductant is triethanolamine.

5. A process as in claim 1 wherein the thermal initiator is ammonium persulfate.

6. A process as in claim 1 wherein the thermal initiator is 4,4'-azobis-4-cyanovaleric acid.

7. A process as in claim 1 wherein the monomer concentration is 40 to 60 percent by weight.

8. A process as in claim 1 wherein the monomer is at least one member selected from the group consisting of acrylamide, acrylic acid, methacryloyloxyethyl trimethyl ammonium chloride, methacryloyloxyethyl trimethyl ammonium sulfate, methacrylamido-3-propyl trimethyl ammonium chloride, 3-acrylamido-3-methyl butyl trimethyl ammonium chloride, 3-acrylamido-3-methyl propyl trimethyl ammonium chloride, diallyl-dimethylammonium chloride and 2-acrylamido-2-methyl propane sulfonic acid, or its water-soluble salts.

9. A process as in claim 1 wherein the polymers prepared are copolymers.